(12) United States Patent
Meng et al.

(10) Patent No.: US 11,972,414 B2
(45) Date of Patent: Apr. 30, 2024

(54) DATA RECORDING METHODS AND APPARATUSES, ELECTRONIC DEVICES, AND STORAGE MEDIA

(71) Applicant: ALIPAY (HANGZHOU) INFORMATION TECHNOLOGY CO., LTD., Zhejiang (CN)

(72) Inventors: Zhenzhong Meng, Hangzhou (CN); Lidong Gu, Hangzhou (CN); Ge Jin, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/363,962

(22) Filed: Jun. 30, 2021

(65) Prior Publication Data
US 2021/0326859 A1 Oct. 21, 2021

(30) Foreign Application Priority Data
Aug. 21, 2020 (CN) .......................... 202010850893.4

(51) Int. Cl.
*G06Q 20/36* (2012.01)
*G06Q 20/38* (2012.01)
(Continued)

(52) U.S. Cl.
CPC ..... *G06Q 20/3674* (2013.01); *G06Q 20/3827* (2013.01); *G06Q 20/401* (2013.01);
(Continued)

(58) Field of Classification Search
CPC ........... G06Q 20/3674; G06Q 20/3827; G06Q 20/401; H04L 9/0866
See application file for complete search history.

(56) References Cited

U.S. PATENT DOCUMENTS 6,915,238 B2 * 7/2005 Watts ................. H04B 7/18519
702/188
9,807,086 B2 * 10/2017 Nordstrom .............. G06F 21/31
(Continued)

FOREIGN PATENT DOCUMENTS

CN 109450910 3/2019
CN 109492049 3/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Jacob C. Coppola
(74) *Attorney, Agent, or Firm* — Fish & Richardson P.C.

(57) ABSTRACT

Examples in this application disclose data recording methods, media, and systems. One example method includes receiving an access request for target data from a data user, obtaining the target data from a data owner, generating a blockchain transaction based on the target data, transmitting the blockchain transaction to a blockchain node, where the blockchain node performs a transaction consensus with remaining blockchain nodes, stores the blockchain transaction in the blockchain upon the transaction consensus is reached, and generates index information for the blockchain transaction when the data user is determined to have an access permission to the target data, receiving the index information from the blockchain node, where the index information is used to generate a request transaction to obtain the blockchain transaction or the target data from the blockchain, and sending the target data or the index information to the data user.

17 Claims, 7 Drawing Sheets

(51) Int. Cl.
    *G06Q 20/40*     (2012.01)
    *H04L 9/00*     (2022.01)
    *H04L 9/08*     (2006.01)

(52) U.S. Cl.
    CPC .............. *H04L 9/0866* (2013.01); *H04L 9/50* (2022.05); *H04L 2209/56* (2013.01)

(56) References Cited

U.S. PATENT DOCUMENTS

| | | | | |
|---|---|---|---|---|
| 2003/0033545 | A1* | 2/2003 | Wenisch | H04L 63/04 713/182 |
| 2003/0074327 | A1* | 4/2003 | Meadow | G06Q 20/04 705/75 |
| 2006/0089919 | A1* | 4/2006 | Kidd | G06Q 20/12 705/75 |
| 2006/0173794 | A1* | 8/2006 | Sellars | G06Q 20/38215 705/76 |
| 2015/0294308 | A1* | 10/2015 | Pauker | G06Q 20/02 705/67 |
| 2016/0014076 | A1* | 1/2016 | Hansen | H04L 63/0227 726/11 |
| 2016/0105402 | A1* | 4/2016 | Soon-Shiong | G16H 40/20 713/164 |
| 2016/0162873 | A1* | 6/2016 | Zhou | G06Q 20/3674 705/67 |
| 2016/0342977 | A1* | 11/2016 | Lam | G06Q 20/0658 |
| 2017/0323294 | A1* | 11/2017 | Rohlfing | G06Q 20/401 |
| 2018/0082043 | A1* | 3/2018 | Witchey | G16H 10/60 |
| 2018/0260909 | A1 | 9/2018 | Li | |
| 2018/0287805 | A1 | 10/2018 | Ramathal et al. | |
| 2019/0028277 | A1* | 1/2019 | Jayachandran | H04L 9/3247 |
| 2019/0034923 | A1* | 1/2019 | Greco | G06Q 20/383 |
| 2019/0068615 | A1* | 2/2019 | Pack | H04L 9/3239 |
| 2019/0095585 | A1 | 3/2019 | Jawaharlal et al. | |
| 2019/0097807 | A1* | 3/2019 | Mahanta | H04L 9/3239 |
| 2019/0220859 | A1* | 7/2019 | Weight | G06Q 20/3829 |
| 2020/0065802 | A1* | 2/2020 | Mathieson | H04L 9/0637 |
| 2020/0067907 | A1* | 2/2020 | Avetisov | H04L 63/12 |
| 2020/0211007 | A1* | 7/2020 | Li | G06Q 20/065 |
| 2020/0219097 | A1* | 7/2020 | Chan | G06Q 20/401 |
| 2020/0311299 | A1* | 10/2020 | Amar | G06F 21/62 |
| 2021/0021577 | A1* | 1/2021 | Sazonov | H04L 9/3239 |
| 2021/0036866 | A1* | 2/2021 | Zolfonoon | H04L 67/34 |
| 2021/0135880 | A1* | 5/2021 | Cheng | H04L 9/3239 |
| 2021/0157938 | A1* | 5/2021 | Chen | H04L 9/088 |
| 2021/0176039 | A1* | 6/2021 | Fang | G16H 10/60 |

FOREIGN PATENT DOCUMENTS

| | | | | |
|---|---|---|---|---|
| CN | 109522330 | | 3/2019 | |
| CN | 109785132 | | 5/2019 | |
| CN | 109981750 | | 7/2019 | |
| CN | 110059495 | | 7/2019 | |
| CN | 110535872 | | 12/2019 | |
| CN | 110602096 | | 12/2019 | |
| CN | 110990883 | | 4/2020 | |
| CN | 111144881 | | 5/2020 | |
| CN | 111177277 | | 5/2020 | |
| CN | 111310237 | | 6/2020 | |
| CN | 111459895 | | 7/2020 | |
| WO | WO-2019089044 A1 * | 5/2019 | ............ G06F 21/62 |
| WO | WO 2020143856 | | 7/2020 | |

OTHER PUBLICATIONS

Nakamoto, "Bitcoin: A Peer-to-Peer Electronic Cash System," www.bitcoin.org, 2005, 9 pages.

Extended European Search Report in European Applicant No. 21179515.8, dated Dec. 21, 2021, 9 pages.

* cited by examiner

DATA RECORDING METHODS AND APPARATUSES, ELECTRONIC DEVICES, AND STORAGE MEDIA

CROSS-REFERENCE TO RELATED APPLICATIONS

This application claims priority to Chinese Patent Application No. 202010850893.4, filed on Aug. 21, 2020, which is hereby incorporated by reference in its entirety.

TECHNICAL FIELD

One or more embodiments of the present specification relate to the field of blockchain technologies, and in particular, to data recording methods and apparatuses, electronic devices, and storage media.

BACKGROUND

Blockchain technologies (also referred to as distributed ledger technologies) are decentralized distributed database technologies, which have many characteristics such as decentralization, publicity and transparency, tamper-resistance, and trustworthiness, and are suitable for many application scenarios with high requirements for data reliability.

SUMMARY

In view of this, one or more embodiments of the present specification provide data recording methods and apparatuses, electronic devices, and storage media.

One or more embodiments of the present specification provide technical solutions as follows:

According to a first aspect of one or more embodiments of the present specification, a data recording method is provided. The data recording method is applied to a service processor and includes the following:

Target data is obtained from a data owner, where the service processor has permission to obtain data from the data owner.

A blockchain transaction is generated based on the target data when the target data is obtained in response to an access request initiated by a data user, and the generated blockchain transaction is transmitted to a blockchain node, so that the blockchain node performs transaction consensus with other nodes contained in a blockchain network that includes the blockchain node, and stores the blockchain transaction in a blockchain when the consensus is reached.

The target data obtained from the data owner or index information generated by the blockchain node for the blockchain transaction is returned to the data user when the data user is determined to have access permission to the target data, where the index information is used by the data user to generate a request transaction for the blockchain transaction to obtain the blockchain transaction or the target data contained in the blockchain transaction from any node in the blockchain network that includes the blockchain node.

According to a second aspect of one or more embodiments of the present specification, a data recording apparatus is provided. The data recording apparatus is applied to a service processor and includes: a first transmitting unit, configured to obtain target data from a data owner, where the service processor has permission to obtain data from the data owner; a second transmitting unit, configured to generate a blockchain transaction based on the target data when the target data is obtained in response to an access request initiated by a data user, and transmit the generated blockchain transaction to a blockchain node, so that the blockchain node performs transaction consensus with other nodes contained in a blockchain network that includes the blockchain node, and stores the blockchain transaction in a blockchain when the consensus is reached; and a returning unit, configured to return the target data obtained from the data owner or index information generated by the blockchain node for the blockchain transaction to the data user when the data user is determined to have access permission to the target data, where the index information is used by the data user to generate a request transaction for the blockchain transaction to obtain the blockchain transaction or the target data contained in the blockchain transaction from any node in the blockchain network that includes the blockchain node.

According to a third aspect of one or more embodiments of the present specification, an electronic device is provided. The electronic device includes: a processor; and a memory configured to store executable instructions of the processor, where the processor implements the method as described in the first aspect by running the executable instructions.

According to a fourth aspect of one or more embodiments of the present specification, a computer readable storage medium is provided, which stores computer instructions that, when executed by a processor, implement the steps of the method as described in the first aspect.

DESCRIPTION OF EMBODIMENTS

Reference will now be made in detail to the explanatory embodiments, examples of which are illustrated in the accompanying drawings. When the following description refers to the accompanying drawings, like numerals in different drawings indicate the same or similar elements, unless otherwise indicated. The implementations described in the following explanatory embodiments do not represent all implementations consistent with one or more embodiments of the present specification. Rather, they are merely examples of apparatus and methods consistent with some aspects of one or more embodiments of the present specification as detailed in the appended claims.

It is worthwhile to note that in other embodiments, the steps of the corresponding methods are not necessarily performed in the order shown and described in the present specification. In some other embodiments, the methods may include more or fewer steps than those described in the present specification. Moreover, in other embodiments, a single step described in the present specification may be described as being broken down into multiple steps. In other embodiments, multiple steps described in the present specification may be combined into a single step for description.

Blockchain technologies (also referred to as distributed ledger technologies) are decentralized distributed database technologies, which have many characteristics such as decentralization, publicity and transparency, tamper-resistance, and trustworthiness, and are suitable for many application scenarios with high requirements for data reliability.

However, along with the previous superior characteristics of the blockchain technologies, there are also relatively big disadvantages. Since the blockchain technologies realize the cross verification of data in a way that all nodes in a blockchain network store one complete distributed ledger, the reliability of the data is ensured. Backups are stored in all nodes when any data is stored in a blockchain. Therefore, storage space on the blockchain appears to be particularly valuable.

However, in the related art, when the blockchain technologies are used to store data, the data is not effectively screened, but rather all the data is simply and crudely stored in the blockchain (i.e., all the data is recorded). Through the data recording methods, precious blockchain storage resources are rapidly occupied, a large amount of data with low degree of importance is included, and the utilization rate of the blockchain storage resources is greatly reduced.

In view of this, the present specification provides a data recording method to solve the technical problem of low utilization rate of blockchain storage resources due to unscreened recorded data.

Figure 1:
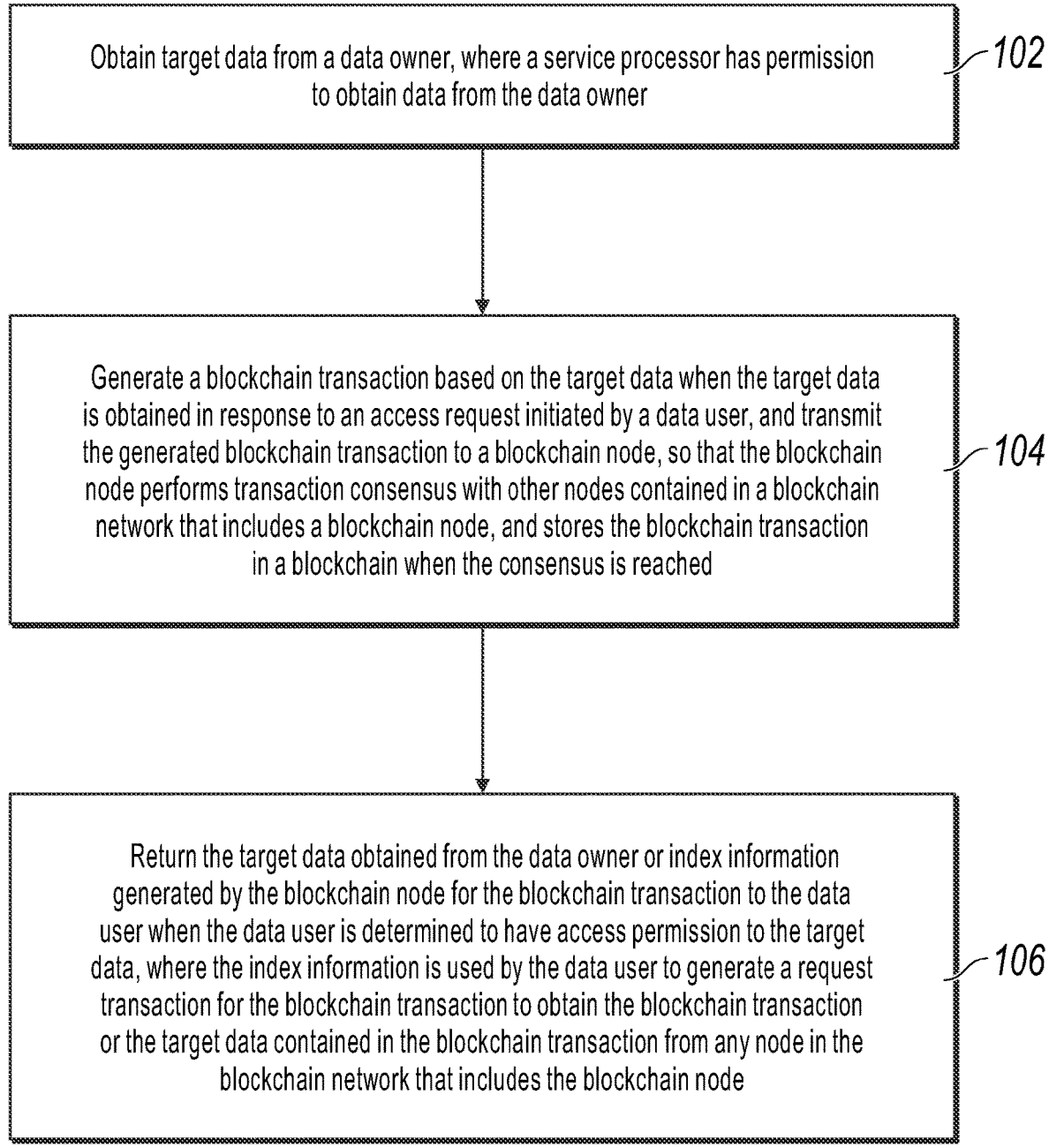
FIG. 1 is a flowchart illustrating a data recording method, according to one or more explanatory embodiments of the present specification.

FIG. 1 is a flowchart illustrating a data recording method, according to one or more explanatory embodiments of the present specification. The method is applied to a service processor. As shown in FIG. 1, the method can include the following steps:

S102. Obtain target data from a data owner, where the service processor has permission to obtain data from the data owner.

As described above, in the related art, when the blockchain technologies are used to store data, the data is not screened, but rather all the data is simply stored in the blockchain, so that a large amount of data with low degree of importance is stored in the blockchain. For example, a part of the data is stored in the blockchain and is never accessed by any organization or individual.

It should be understood that for data, the purpose of being stored is to be obtainable at any time when needed. In other words, if data has a demand of being accessed, the data usually has a greater degree of importance. Therefore, the present specification regards whether or not data is accessed as a criterion for data recording, and only data having a demand of being accessed is recorded. Through the method, the problem of low utilization rate of blockchain storage resources due to unscreened recorded data in the related art can be alleviated on the premise that important data is recorded.

In the present specification, it is determined whether or not there is a demand of being accessed for data depending on whether or not a service processor receives an access request from a data user. The data user can be any organization or individual, and an access request for target data can be transmitted to any type of service processor through a client device in use.

In one or more embodiments, the data user can transmit an access request for target data to a service system of a data owner. For example, the data owner can be an organization, a data management system corresponding to the data owner stores target data to be accessed by the data user, and then the service system corresponding to the organization can serve as the service processor in the present specification. In this embodiment, when receiving an access request for target data, the service system can parse out identification information of the target data from the access request, and generate an acquisition request containing the identification information. The acquisition request is transmitted to the data management system of the data owner so that the data management system parses out the identification information of the target data therefrom, and then the target data is identified based on the parsed-out identification information. On this basis, the data management system can return the identified target data to the service system so that the service system records the target data or returns the target data to the data user.

In other embodiments, the data user can transmit an access request for target data to a service processing platform corresponding to each data owner. For example, various data owners can be a number of organizations that perform service processing through a unified service processing platform. The service processing platform can serve as the service processor in the present specification. In the embodiments, when the service processing platform receives an access request for target data, the service processing platform can still parse out identification information of the target data from the access request, and generate an acquisition request containing the identification information. On this basis, when a data owner storing the target data is determined, the generated acquisition request can be transmitted to a service system of the determined data owner, so that the service system forwards the received acquisition request to a data management system of the determined data owner. The data management system can parse out the identification information of the target data from the acquisition request, identify the target data, and then return the target data to the service processing platform via the service system. In the embodiments, the data owner storing the target data can be determined in a variety of ways. For example, in one case, the service processing platform can parse out indication information used for representing the data owner storing the target data from the access request, thereby determining the data owner storing the target data. In another case, the service processing platform can pre-create a data storage record table that records identification information of data stored by each data owner. Therefore, when the identification information of the target data is identified, the data owner storing the target data can be determined by searching the data storage record table based on the identification information.

It is worthwhile to note that regardless of whether the service processor is the service system or the service processing platform, the service processor in the present specification should have permission to obtain data from the data owner. For example, when the service processor is a service system corresponding to any data owner, the service system should have permission to access data of the data owner, and the permission can be granted by the data owner to the service system in advance. When the service processor is a service processing platform corresponding to each data owner, the service processing platform should have permission to access data of the data owners, and the permission can be granted by the data owners to the service processing platform separately. In addition, the service processor in the present specification can be any type of electronic device. For example, the service processor can be a mobile device such as a smartphone and a tablet, or a fixed end-user device such as a personal computer (PC) and a server. Of course, besides being a single electronic device, the service processor can also be a device cluster such as a server cluster. The specific form of the service processing platform can be determined by a person skilled in the art based on practical situations, and will not be limited by the present specification.

S104. Generate a blockchain transaction based on the target data when the target data is obtained in response to an access request initiated by a data user, and transmit the generated blockchain transaction to a blockchain node, so that the blockchain node performs transaction consensus with other nodes contained in a blockchain network that includes the blockchain node, and stores the blockchain transaction in a blockchain when the consensus is reached.

When the service processor receives an access request for target data by the data user, this means that there is a demand for the target data to be accessed. Therefore, when the service processor receives target data returned by the data owner, the service processor can generate a blockchain transaction based on the received target data, and transmit the generated blockchain transaction to the blockchain node so as to store the target data in the blockchain.

In the present specification, when the blockchain node receives a blockchain transaction generated by the service processor, the blockchain node can perform transaction consensus on the blockchain transaction with other blockchain nodes in a blockchain network that includes the blockchain node, and store the blockchain transaction in the blockchain when the consensus is reached. Specifically, each blockchain node can store the blockchain transaction in a blockchain storage structure of the blockchain node.

S106. Return the target data obtained from the data owner or index information generated by the blockchain node for the blockchain transaction to the data user when the data user is determined to have access permission to the target data, where the index information is used by the data user to generate a request transaction for the blockchain transaction to obtain the blockchain transaction or the target data contained in the blockchain transaction from any node in the blockchain network that includes the blockchain node.

In the present specification, the service processor needs to return the target data returned by the data owner to the data user in addition to storing the target data in the blockchain, so as to satisfy the access demand of the data user for the target data.

In the present specification, the target data can be returned to the data user in a variety of ways.

In one or more embodiments, the service processor can return the target data obtained from the data owner to the data user directly without additional data interaction, so that the data user can quickly obtain the target data.

In other embodiments, when a blockchain transaction generated based on target data is stored in the blockchain, the blockchain node generates corresponding index information for the blockchain transaction, so that a user obtains the target data from the blockchain through the index information. In the embodiments, the blockchain node can return the index information generated for the blockchain transaction to the service processor, and the service processor returns identification information to the data user. On this basis, the data user can generate a request transaction for the blockchain transaction corresponding to the target data based on the index information so as to obtain the blockchain transaction corresponding to the target data or the target data included in the blockchain transaction from the blockchain node. In this case, the data user obtains the target data from the blockchain through the index information, and the reliability of the target data is ensured since the blockchain storage technology has superior characteristics such as tamper-resistance.

In the present specification, data should also be prevented from being stored repeatedly in view of precious blockchain storage resources. Therefore, when receiving an access request transmitted by the data user, the service processor can also preferentially determine whether data requested for access is already stored in the blockchain. When it is determined that the data is already stored in the blockchain, index information generated by the blockchain node for the data is directly returned to the data user. When it is determined that the data is not stored in the blockchain, the previous operation of obtaining data from the data owner and recording the data is executed. In practice, the service processor can record a correspondence between data already stored in the blockchain and index information of the data. Based on the correspondence, the service processor can determine whether there is a correspondence matched with data targeted by an access request; and if yes, the service processor determines that the data targeted by the access request is already stored in the blockchain; otherwise, the service processor determines that the data targeted by the access request is not stored in the blockchain.

In the present specification, to ensure the security of data, it is also necessary to verify whether a data user who initiates an access request for target data has permission to access the data. The service processor can receive verifiable authorization information transmitted by the data user, and determine whether the verifiable authorization information is issued by the data owner of the target data and whether the verifiable authorization information is used for granting the target data to the data user. When the verifiable authorization information is issued by the data owner of the target data and is used for granting the target data to a data user who initiates an access request, it is determined that the data user has access permission to the target data.

In the process of actually verifying the verifiable authorization information, the verifiable authorization information needs to be separately verified from three aspects: 1. whether the verifiable authorization information is issued for target data. 2. whether the verifiable authorization information is issued by a data owner of target data. 3. whether the verifiable authorization information is issued to a data user transmitting an access request.

When verifying whether the verifiable authorization information is issued for target data, the service processor can determine whether identification information of the target data is contained by parsing the content of the verifiable authorization information, and if yes, it is determined that the verifiable authorization information is issued for the target data.

When verifying whether the verifiable authorization information is issued by a data owner of target data, the data owner can sign the verifiable authorization information based on an identity private key of the data owner in the process of generating the verifiable authorization information. On this basis, when the service processor receives the verifiable authorization information transmitted by the data user, the service processor can perform verification through an identity public key of the data owner, and if the verification is successful, determine that the verifiable authorization information is issued by the data owner of the target data. In practice, the data owner can register a corresponding decentralized identifier (DID) with the blockchain, and store the identity public key of the data owner in a DID document corresponding to the DID. Therefore, the service processor can obtain the identity public key of the data owner from the blockchain registered with the DID of the data owner, to verify an issuer of the verifiable authorization information.

When verifying whether the verifiable authorization information is issued to a data user transmitting an access request, on one hand, the service processor can generate a random character for verifying the identity of the data user and transmit the random character to the data user, so that the data user signs based on an identity private key of the data user and then returns the random character. On the other hand, the service processor can parse the content of the verifiable authorization information to determine an issuing object of the verifiable authorization information. On this basis, the service processor can verify and sign the received random character with a signature of the data user based on an identity public key of the issuing object of the verifiable authorization information, and when the verification and signature are successful, determine that the verifiable authorization information is issued to the data user transmitting the access request. In practice, the service processor can parse the verifiable authorization information to obtain identification information of an issuing object. For example, a DID of the issuing object can be obtained, an identity public key of the issuing object can be obtained from a blockchain registered with the DID of the issuing object to verify and sign a random character returned by the data user, and if the verification and signature are successful, the issuing object of the verifiable authorization information is proved to be the data user.

In the present specification, the index information generated by the blockchain node based on the blockchain transaction can be a hash value of the blockchain transaction; or a serial number of the blockchain transaction; or an index number of data. The index information can be determined by a person skilled in the art based on practical situations, and will not be limited by the present specification.

It can be seen from the previous technical solution that in the present specification, only if an access request for data is received, corresponding data is obtained, and a blockchain transaction corresponding to the data is generated, where the blockchain transaction is transmitted to a blockchain node, so that the blockchain transaction is stored in a blockchain when the consensus between the blockchain node and other nodes in a blockchain network that includes the blockchain node is reached. It can be seen that in the present specification, whether data is recorded depending on whether data is accessed, and only data with a demand of being accessed is recorded, so that the problem in the related art that a large amount of data with low degree of importance is stored in the blockchain since all data is recorded is alleviated, and the utilization rate of blockchain storage resources is improved.

Further, after receiving data returned by the data owner, the service processor in the present specification transmits the data to the data user so as to satisfy the access demand of the data user for the data. In the process, the service processor can also verify the verifiable authorization information provided by the data user, so as to determine whether the data user has permission to obtain data requested by the data user, and return the data to the data user only when it is determined that the data user has permission to access the requested data, thereby ensuring the security of the data.

Hereinafter, the technical solution of the present specification will be described with reference to specific scenarios.

Figure 2:
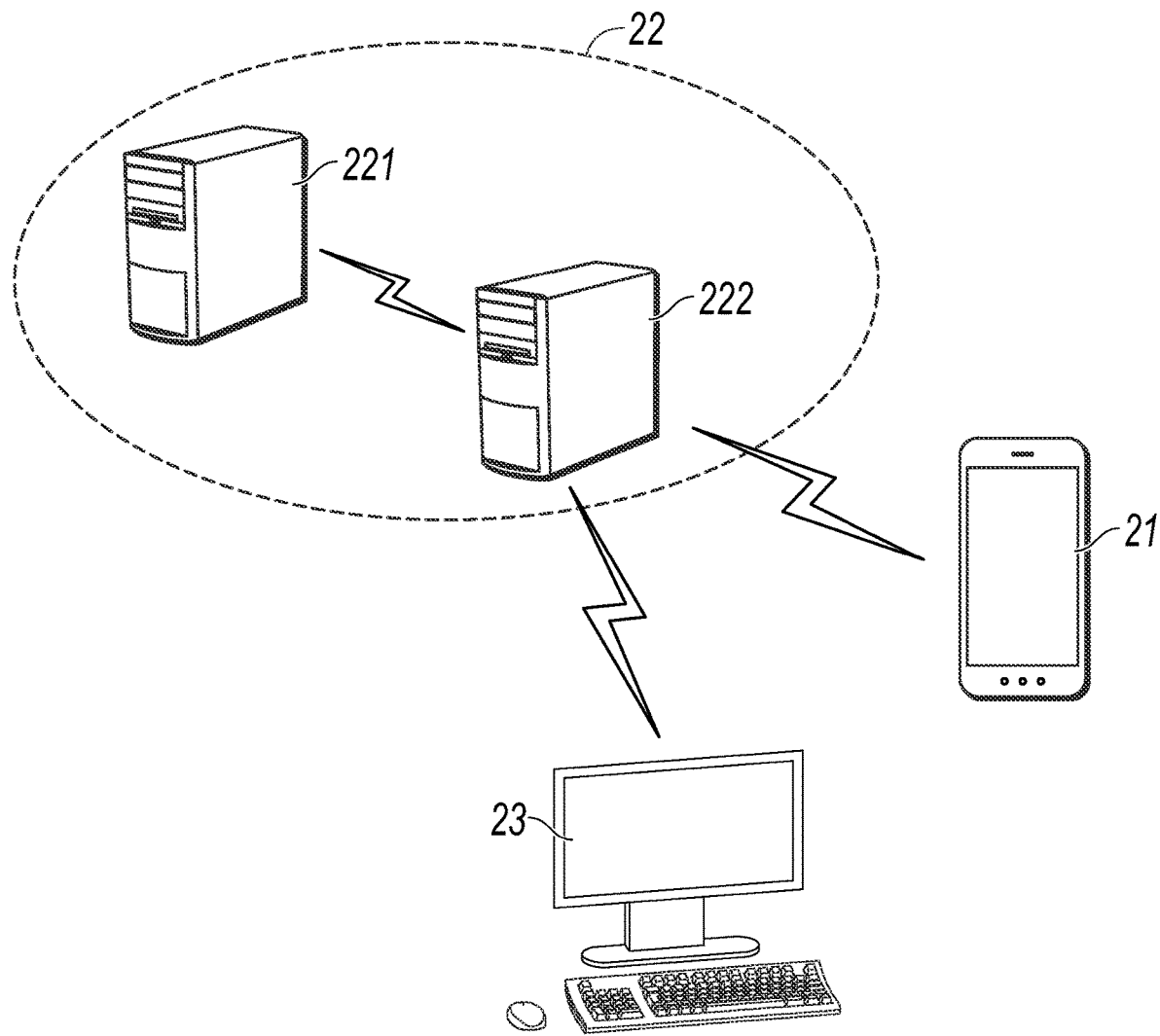
FIG. 2 is a schematic diagram illustrating a data recording architecture, according to one or more explanatory embodiments of the present specification.

FIG. 2 is a schematic diagram illustrating a data recording architecture, according to one or more explanatory embodiments of the present specification. As shown in FIG. 2, the data recording architecture includes a client device 21, an organization 22, and a blockchain node 23. The organization 22 includes a data management system 221 and a service system 222. In practice, the data management system is only responsible for storing and managing data for any organization, and if data interaction is involved, the data interaction needs to be performed by the service system. Therefore, when the client device 21 needs to access data maintained by the organization 22, the client device 21 typically transmits an access request to the service system 222, and the service system 222 obtains data from the data management system 221 and returns the data to the client device 21. In other words, in the architecture, the client device 21 acts as the data user in the present specification, the data management system 221 of the organization 22 acts as the data owner in the present specification, and the service system 222 of the organization 22 acts as the service processor in the present specification. The data recording method based on the architecture is described with reference to FIG. 3.

Figure 3:
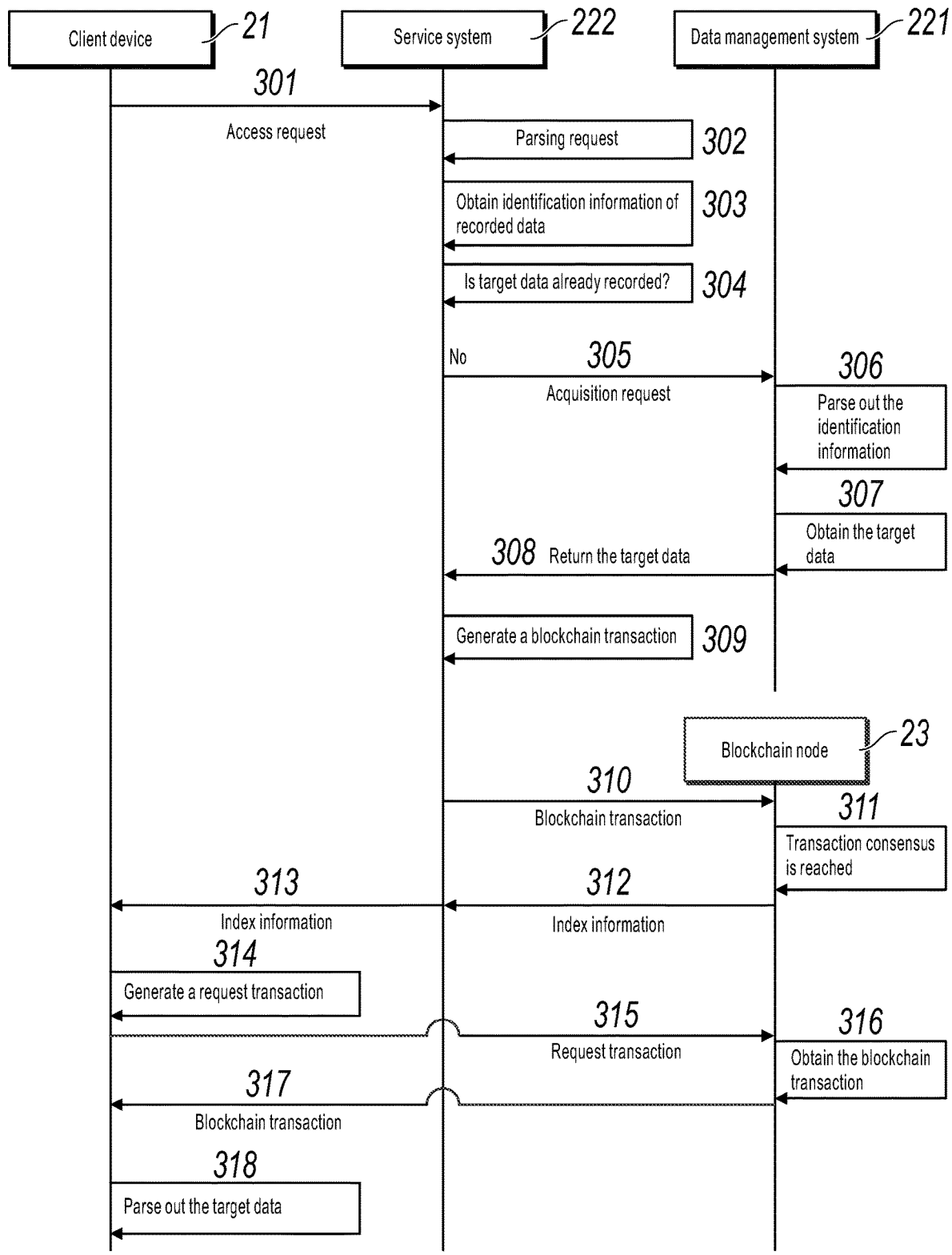
FIG. 3 is an interaction diagram illustrating a data recording method, according to one or more explanatory embodiments of the present specification.

FIG. 3 is an interaction diagram illustrating a data recording method, according to one or more explanatory embodiments of the present specification.

S301. The client device 21 transmits an access request for target data to the service system 222.

In the embodiments, the client device 21 interacts directly with the service system 222 corresponding to the organization 22 to obtain data to be accessed.

S302. The service system 222 parses the access request to obtain identification information of the target data.

S303. The service system 222 obtains identification information of recorded data.

S304. The service system 222 determines whether the target data is already recorded based on the identification information of the recorded data and the identification information of the target data; and if yes, directly returns index information of the target data to the client device 21; otherwise, proceeds to S305.

In the embodiments, information regarding the data that is maintained by the organization 22 and already recorded can be stored in the service system 222. For example, a correspondence between identification information of such data and index information of the data on the blockchain can be stored. When the access request for the target data transmitted by the client device 21 is received and the identification information of the target data is parsed out therefrom, it can be determined whether the target data is already recorded based on the recorded correspondence between the identification information of the recorded data and the index relationship. If a correspondence between the identification information of the target data and the index information of the target data is already recorded, it is determined that the target data is already recorded, the index information of the target data can be directly returned to the client device 21, so that the client device 21 obtains the target data from the blockchain node 23 based on the received index information. Otherwise, an operation of obtaining target data from the data management system 221 and recording the obtained target data is executed.

For ease of understanding, by way of example, it is assumed that the correspondence between the identification information of the recorded data and the index information recorded in the service system 222 is shown in Table 1.

TABLE 1

| Identification information | Index information |
|---|---|
| Data A | X1 |
| Data C | X3 |
| Data D | X4 |

Assuming that the identification information of the target data parsed out from the access request transmitted by the client device 21 is data A, index information X1 corresponding to data A can be directly returned to the client device 21 so that the client device 21 obtains original data of data A from the blockchain node 23 based on index information X1. If the identification information of the parsed-out target data is data B, identification information of data B cannot be identified from the stored correspondence of recorded data. Therefore, an operation of obtaining original data of data B from the data management system 221 is executed.

S305. The service system 222 transmits an acquisition request for the target data to the data management system 221 based on the parsed-out identification information.

In the present step, the service system 222 can generate the acquisition request based on the parsed-out identification information and transmit the acquisition request to the data management system 221, so that the data management system 221 searches for and returns target data.

Continuing with the previous example, an acquisition request can be generated based on the identification information of data B and transmitted to the data management system 221, and the data management system 221 searches for and returns the original data of data B based on the identification information of data B.

S306. The data management system 221 parses the received acquisition request to obtain the identification information of the target data.

S307. The data management system 221 obtains the target data based on the parsed-out identification information.

Continuing with the previous example, the service system 222 can generate an acquisition request for the original data of data B based on the identification information of data B and transmit the acquisition request to the data management system 221. When receiving the acquisition request, the data management system 221 can parse the acquisition request to obtain the identification information of data B to search for the original data of data B locally. For example, data shown in Table 2 can be stored locally.

TABLE 2

| Identification information | Original data |
|---|---|
| Data A | M1 |
| Data B | M2 |
| Data C | M3 |
| Data D | M4 |
| Data E | M5 |

On this basis, the data management system 221 can identify original data M2 of data B, and return original data M2 to the service system 222.

S308. The data management system 221 returns the obtained target data to the service system 222.

S309. The service system 222 generates a blockchain transaction based on the received target data.

Continuing with the previous example, when receiving original data M2 of data B returned by the data management system 221, the service system 222 can generate a blockchain transaction based on original data M2 to execute an operation of recording original data M2.

S310. The service system 222 transmits the generated blockchain transaction to the blockchain node 23.

S311. The blockchain node 23 performs transaction consensus on the received blockchain transaction with other nodes in a blockchain network that includes the blockchain node.

S312. The blockchain node 23 stores the blockchain transaction when the consensus is reached, and transmits index information of the blockchain transaction to the service system 222.

In the embodiments, the consensus can be performed for the blockchain transaction in any type of consensus way. For example, Proof of Work (POW) can be used to perform the consensus for the blockchain transaction, or Practical Byzantine Fault Tolerance (PBFT) can be used to perform the consensus for the blockchain transaction, which will not be limited in the present specification. The consensus can be performed directly based on the blockchain transaction, or a hash value of the blockchain transaction can be preferentially calculated and then the consensus can be performed for the calculated hash value, which will not be limited in the present specification.

Continuing with the previous example, assuming that index information generated by the blockchain node 23 for the blockchain transaction generated based on original data M2 is X2, index information X2 can be returned to the service system 222 while storing the blockchain transaction generated based on original data M2 in the blockchain.

S313. The service system 222 transmits the received index information to the client device 21.

Continuing with the previous example, when the service system 222 receives index information X2, on the one hand, a correspondence between the identification information of data B and index information X2 can be recorded locally for providing index information X2 to subsequent visitors for original data M2 of data B. On the other hand, index information X2 can be returned to the client device 21 so that the client device 21 obtains original data M2 of data B from the blockchain node 23 based on the index information.

S314. The client device 21 generates a request transaction for the blockchain transaction corresponding to the target data based on the index information.

S315. The client device 21 transmits the generated request transaction to the blockchain node 23.

S316. The blockchain node 23 obtains a blockchain transaction corresponding to the target data based on the index information in the request transaction.

S317. The blockchain node 23 returns the blockchain transaction corresponding to the target data to the client device 21.

S318. The client device 21 parses the received blockchain transaction to obtain the target data.

It is worthwhile to note that although the client device 21 in the embodiments obtains original data M2 of data B from the blockchain node 23 based on index information X2 of data B, in practice, original data M2 of data B can be obtained from any node in the blockchain network that includes the blockchain node 23. In addition, the service system 222 can directly return the obtained target data to the client device 21 without transmitting the index information of the target data to the client device 21, and the client device 21 obtains the target data.

It can be seen from the previous technical solution that when a service system of any organization receives a data access request, corresponding data can be obtained from a data management system of the organization, and a blockchain transaction is generated based on the obtained data so as to record the data. In other words, for any organization, data is not actively recorded any more, but only when a data access request is received, the requested data is recorded, so that the data with the demand of being accessed is recorded, and other data is not recorded, thereby alleviating the technical problem in the related art of low utilization rate of blockchain storage resources since all data is stored in the blockchain.

Figure 4:
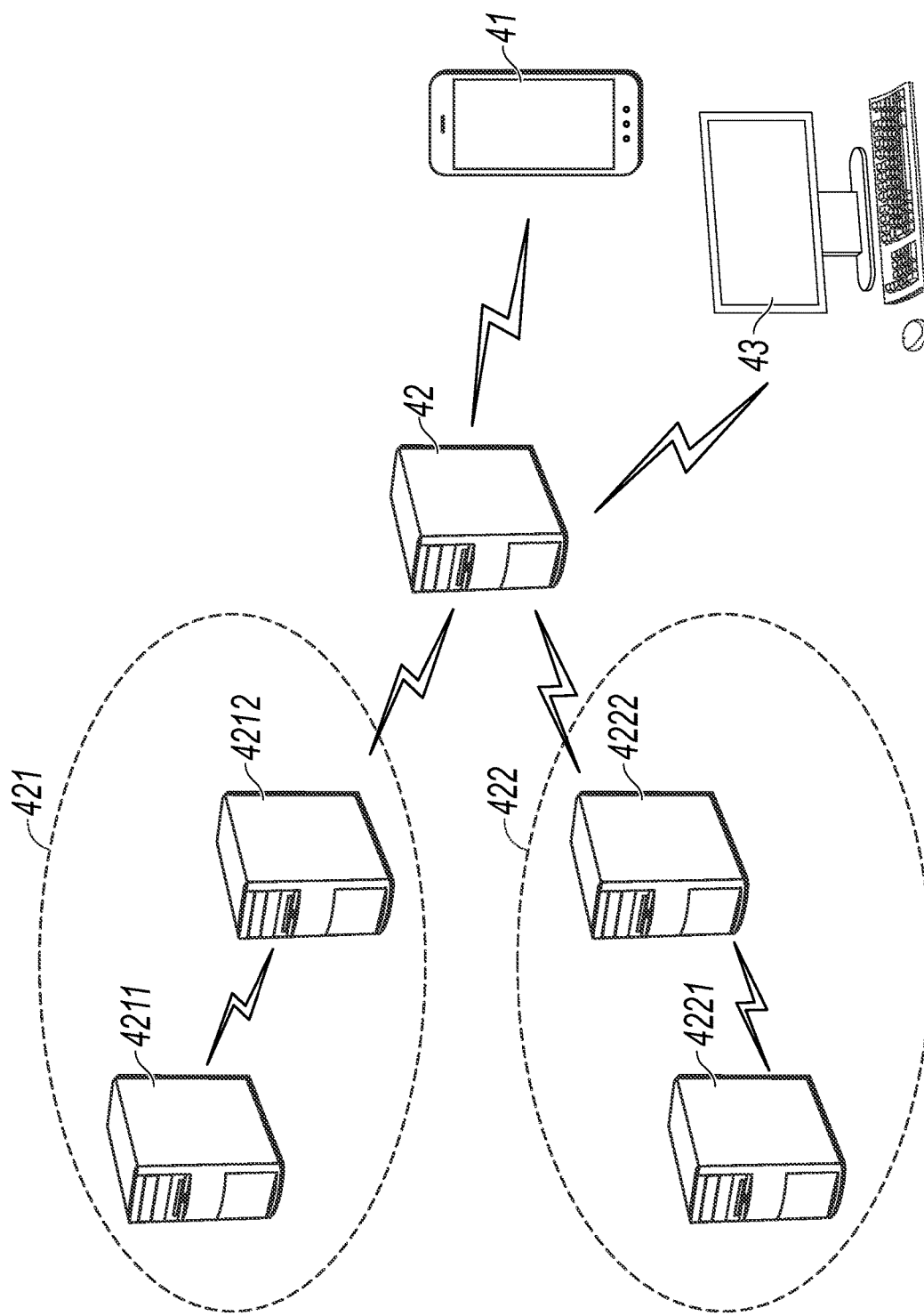
FIG. 4 is a schematic diagram illustrating another data recording architecture, according to one or more explanatory embodiments of the present specification.

FIG. 4 is a schematic diagram illustrating another data recording architecture, according to one or more explanatory embodiments of the present specification. As shown in FIG. 4, the data recording architecture includes: a client device 41, a service processing platform 42, an organization 421, an organization 422, and a blockchain node 43. The service processing platform 42 is responsible for the overall management of data interaction between the organizations. It is worthwhile to note that the organization 421 and the organization 422 shown in FIG. 4 are merely illustrative, in practice, the number of organizations subjected to overall management by the service processing platform 42 may not be limited to the organization 421 and the organization 422. Each of the organizations includes a data management system and a service system. For example, the organization 421 in FIG. 4 includes a data management system 4211 and a service system 4212. The data management system 4211 is responsible for storing and managing data maintained by the organization 421, and the service system 4212 is responsible for interacting with the service processing platform. The same is true of the organization 422. Details are omitted here for simplicity. In the architecture, the client device 41 acts as the data user in the present specification, the service processing platform 42 acts as the service processor in the present specification, and organizations such as the organization 421 and the organization 422 subjected to overall management by the service processing platform 42 serve as the data owners in the present specification. Next, the data recording method based on the architecture is described with reference to FIG. 5.

Figure 5:
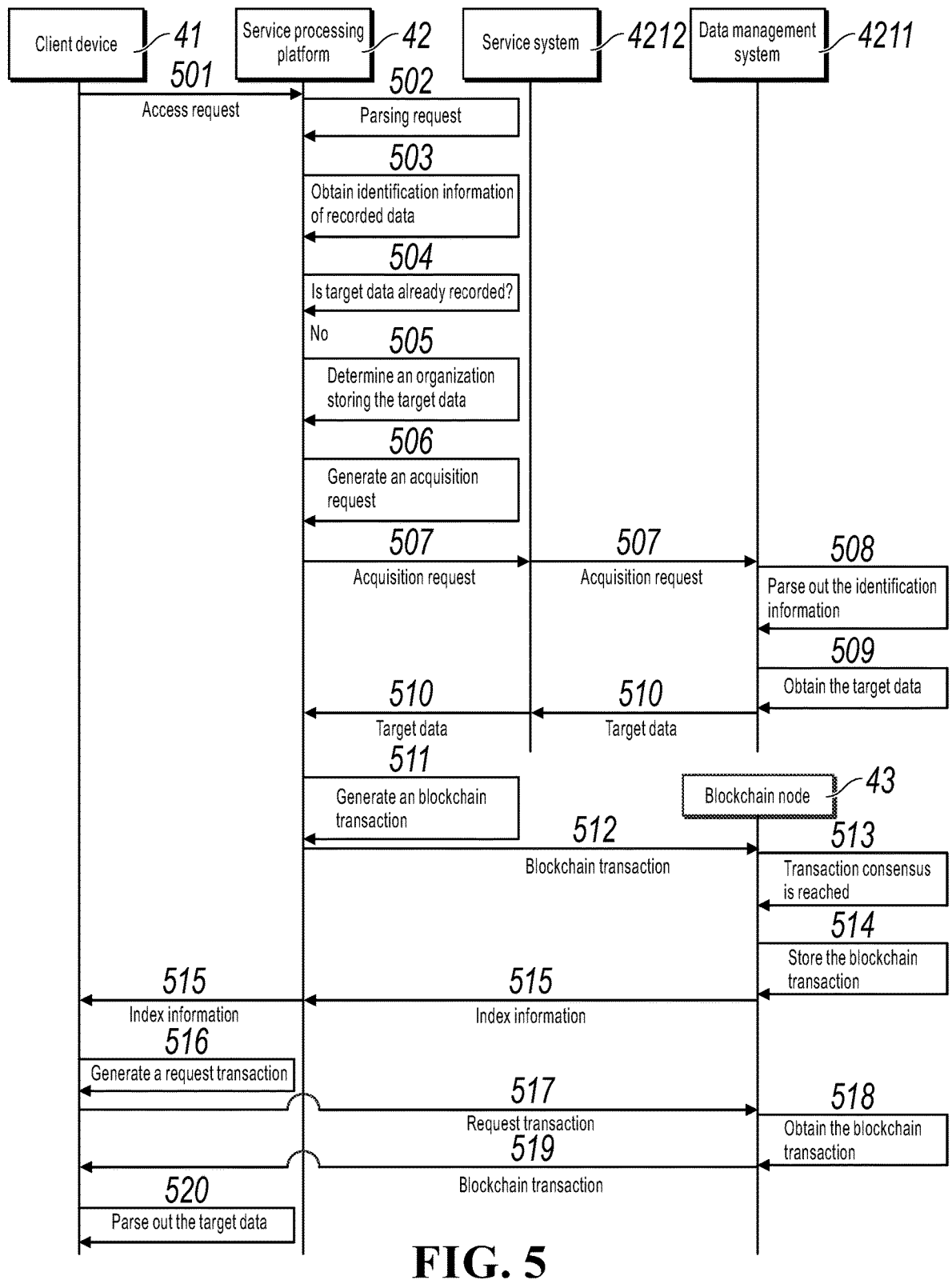
FIG. 5 is an interaction diagram illustrating another data recording method, according to one or more explanatory embodiments of the present specification.

FIG. 5 is an interaction diagram illustrating another data recording method, according to one or more explanatory embodiments of the present specification. As shown in FIG. 5, the method can include the following steps:

S501. The client 41 transmits an access request for target data to the service processing platform 42.

In the previous embodiment, there is in fact a premise that in order to initiate a data access request to a service system of the organization, a client device user must know in advance by which organization target data to be accessed is maintained. However, in practice, the client device user typically cannot know by which organization data to be accessed is maintained. Below embodiments show the data recording method applied to this scenario.

In the embodiments, the service processing platform 42 is responsible for the overall management of data interaction between each organization and a data user. Both the organization 421 and the organization 422 shown in FIG. 4 interact with the client device 41 through the service processing platform 42.

S502. The service processing platform 42 parses the access request to obtain identification information of the target data.

S503. The service processing platform 42 obtains identification information of recorded data.

S504. The service processing platform 42 determines whether the target data is already recorded; and if yes, directly return index information of the target data to the client device 41, so that the client device 41 obtains the target data from the blockchain node 43 based on the received index information; otherwise, proceeds to S505.

In the embodiments, the service processing platform 42 can store a correspondence between identification information of data that is maintained by each organization and already recorded and index information of the data on the blockchain. When the access request for the target data transmitted by the client device 41 is received and the identification information of the target data is parsed out therefrom, it can be determined whether the target data is already recorded based on the recorded correspondence between the identification information of the recorded data and the index relationship. If a correspondence between the identification information of the target data and the index information of the target data is already recorded, it is determined that the target data is already recorded, the index information of the target data can be directly returned to the client device 41, so that the client device 41 obtains the target data from the blockchain node 43 based on the received index information. Otherwise, an operation of determining the organization storing the target data is executed.

S505. The service processing platform 42 obtains information about the data stored by each organization to determine the organization storing the target data (as exemplified by the organization 421).

In the embodiments, the service processing platform 42 can also store the information about the data stored by each organization. For example, a correspondence between each organization and identification information of data stored by the organization can be recorded. For example, a correspondence shown in Table 3 can be recorded.

TABLE 3

| Organization | Index information |
| --- | --- |
| Organization 421 | Data A |
| | Data B |
| | Data C |
| | Data D |
| Organization 422 | Data E |
| | Data F |
| | Data G |
| | Data H |
| . . . | . . . |

Assuming that the identification information of the target data parsed out based on the access request is still data B, the organization storing the original data of data B can be determined as the organization 421.

S506. The service processing platform 42 generates an acquisition request for the target data based on the identification information of the target data.

S507. The service processing platform 42 transmits the generated acquisition request to the service system 4212 of the organization 421, so that the service system 4212 forwards the acquisition request to the data management system 4211.

S508. The data management system 4211 parses the acquisition request to obtain the identification information of the target data.

S509. The data management system 4211 obtains the target data based on the parsed-out identification information.

S510. The data management system 4211 returns the target data to the service system 4212, so that the service system 4212 forwards the target data to the service processing platform 42.

For the process of obtaining the target data by the data management system 4211, references can be made to the description of the data management system 221 in the previous embodiments. Details are omitted here for simplicity.

S511. The service processing platform 42 generates a blockchain transaction based on the received target data.

S512. The service processing platform 42 transmits the generated blockchain transaction to the blockchain node 43.

S513. The blockchain node 43 performs transaction consensus on the received blockchain transaction with other nodes in a blockchain network that includes the blockchain node.

S514. The blockchain node 43 stores the blockchain transaction in the blockchain when the consensus is reached, and transmits index information of the blockchain transaction to the service processing platform 42.

S515. The service processing platform 42 transmits the received index information to the client device 41.

S516. The client device 41 generates a request transaction for the blockchain transaction corresponding to the target data based on the index information.

S517. The client device 41 transmits the generated request transaction to the blockchain node 43.

S518. The blockchain node 43 obtains a blockchain transaction corresponding to the target data based on the index information in the request transaction.

S519. The blockchain node 43 returns the blockchain transaction corresponding to the target data to the client device 41.

S520. The client device 41 parses the received blockchain transaction to obtain the target data.

For the operation of recording the data and returning the index information to the client device 41 to obtain the target data from the blockchain node 43 by the client device 41 based on the index information, references can be made to the description in the previous embodiments, and only "service system 222" is replaced with "service processing platform 42". Details are omitted here for simplicity.

It is worthwhile to note that similar to the previous embodiment, although the client device 41 in the embodiment obtains original data of data B from the blockchain node 43 based on index information of data B, in practice, the original data of data B can be obtained from any node in the blockchain network that includes the blockchain node 43. In addition, the service processing platform 42 can directly return the obtained target data to the client device 41 without transmitting the index information of the target data to the client device 41, and the client device 41 obtains the target data.

Compared with the previous embodiment, the data user in this embodiment does not need to know by which organization data to be accessed is maintained in advance, and only needs to interact through the service processing platform to obtain the data to be accessed. Moreover, the service processing platform in this embodiment also records the corresponding data only when receiving the data access request, thereby alleviating the technical problem in the related art of low utilization rate of blockchain storage resources since all data is stored in the blockchain.

Figure 6:
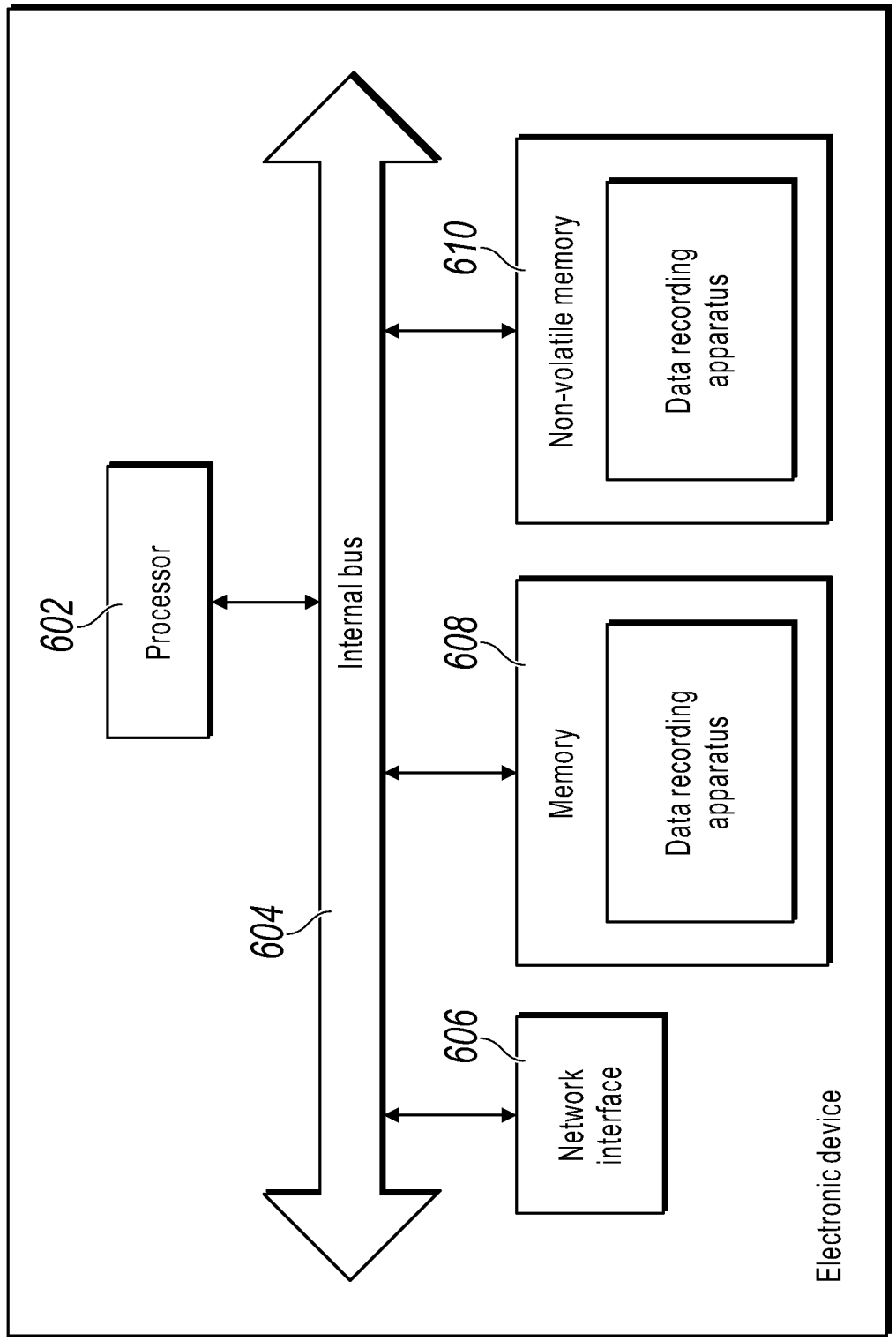
FIG. 6 is a schematic structural diagram illustrating an electronic device, according to one or more explanatory embodiments of the present specification.

FIG. 6 is a schematic structural diagram illustrating an electronic device, according to one or more explanatory embodiments. Referring to FIG. 6, at a hardware level, the device includes a processor 602, an internal bus 604, a network interface 606, a memory 608, and a non-volatile memory 610, and of course, may also include hardware required for other services. The processor 602 reads corresponding computer programs from the non-volatile memory 610 into the memory 608 and then runs the computer programs to form a data recording apparatus at a logical level. Of course, besides software implementations, one or more embodiments of the present specification do not exclude other implementations, such as a logic device or a combination of hardware and software. That is, the executive subject of the following processing flows is not limited to each logic unit, and can be hardware or logic devices.

Figure 7:
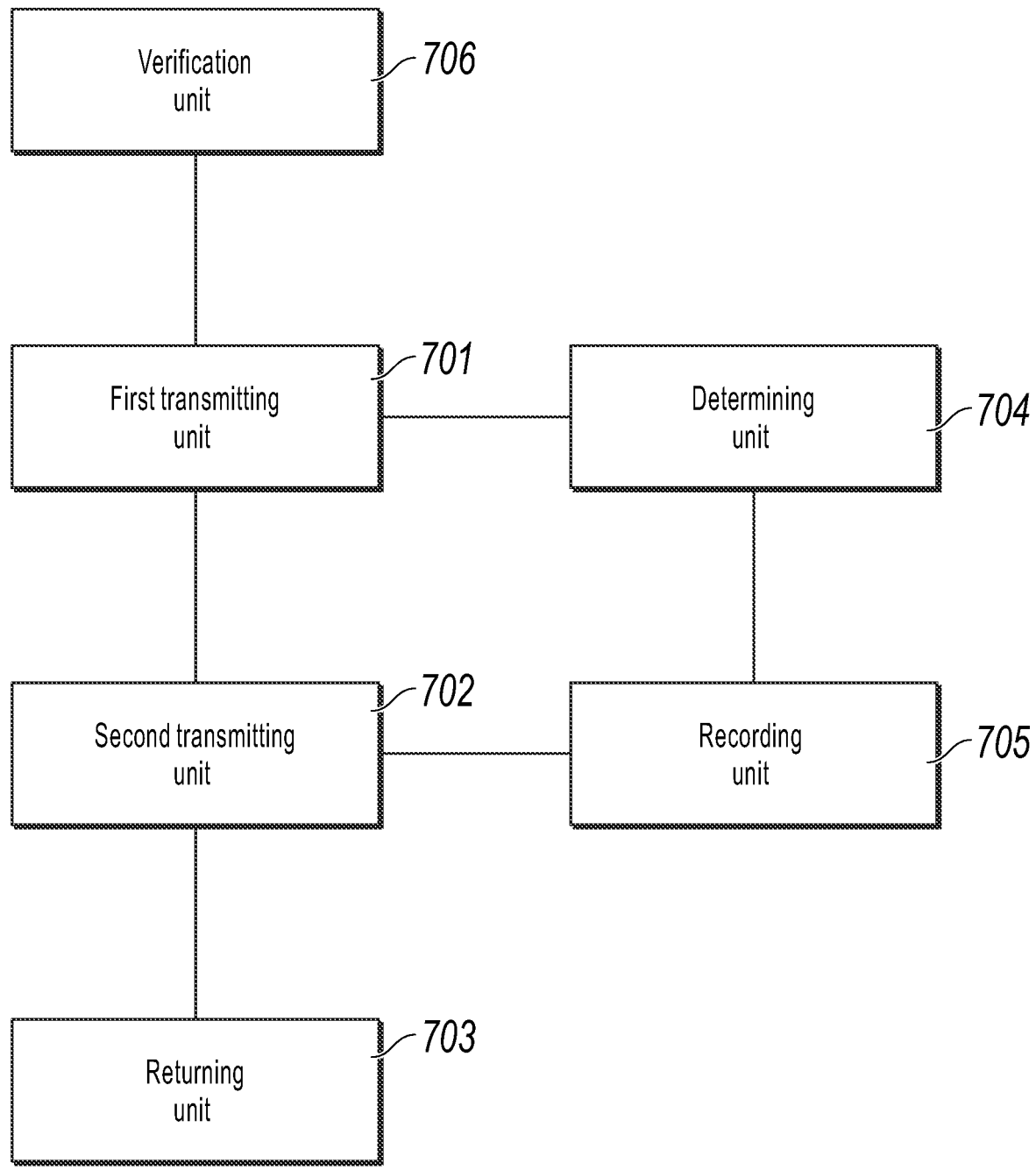
FIG. 7 is a block diagram illustrating a data recording apparatus, according to one or more explanatory embodiments of the present specification.

Referring to FIG. 7, in the software implementations, the data recording apparatus can include: a first transmitting unit 701, configured to obtain target data from a data owner, where the service processor has permission to obtain data from the data owner; a second transmitting unit 702, configured to generate a blockchain transaction based on the target data when the target data is obtained in response to an access request initiated by a data user, and transmit the generated blockchain transaction to a blockchain node, so that the blockchain node performs transaction consensus with other nodes contained in a blockchain network that includes the blockchain node, and stores the blockchain transaction in a blockchain when the consensus is reached; and a returning unit 703, configured to return the target data obtained from the data owner or index information generated by the blockchain node for the blockchain transaction to the data user when the data user is determined to have access permission to the target data, where the index information is used by the data user to generate a request transaction for the blockchain transaction to obtain the blockchain transaction or the target data contained in the blockchain transaction from any node in the blockchain network that includes the blockchain node.

Optionally, the service processor is a service system corresponding to the data owner, and the first transmitting unit is specifically configured to: parse out identification information of the target data from the access request, and generate an acquisition request containing the identification information; and transmit the acquisition request to a data management system corresponding to the data owner, where the acquisition request is parsed by the data management system to obtain the identification information, so that the data management system searches for the target data based on the identification information.

Optionally, the service processor is a service processing platform corresponding to each data owner, and the first transmitting unit is specifically configured to: parse out identification information of the target data from the access request, and generate an acquisition request containing the identification information; and determine a data owner storing the target data, and transmit the acquisition request to a service system of the determined data owner, where the acquisition request is forwarded to a data management system of the determined data owner by the service system and parsed by the data management system to obtain the identification information, so that the data management system searches for the target data based on the identification information.

Optionally, the first transmitting unit is further specifically configured to: parse out indication information used for representing a data owner storing the target data from the access request; or determine a data owner storing the target data from a pre-created data storage record table based on the identification information, where the data storage record table records identification information of data stored by each data owner.

Optionally, the apparatus further includes: a determining unit 704, configured to determine whether the target data is already stored in the blockchain in response to an access request initiated by the data user for target data; and if yes, return index information generated by the blockchain node for the blockchain transaction to the data user; otherwise, execute an operation of obtaining the target data from the data owner and recording the target data.

Optionally, the apparatus further includes: a recording unit 705, configured to record a correspondence between data already stored in the blockchain and index information of the data.

The determining unit 704 is further configured to determine that the target data is already stored in the blockchain if a correspondence matched with the target data exists, and determine that the target data is not stored in the blockchain if no correspondence matched with the target data exists.

Optionally, the apparatus further includes: a verification unit 706, configured to receive verifiable authorization information transmitted by the data user, and determine that the data user has access permission to the target data when the verifiable authorization information is determined to be issued by the data owner and used for granting the target data to the data user.

Optionally, the index information includes: a hash value of the blockchain transaction; or a serial number of the blockchain transaction; or a hash value of the target data.

The system, apparatus, module, or unit illustrated in the previous embodiments can be implemented by using a computer chip or an entity, or can be implemented by using a product having a certain function. A typical implementation device is a computer, and the computer can be a PC, a laptop computer, a cellular phone, a camera phone, a smart phone, a personal digital assistant, a media player, a navigation device, an email receiving and transmitting device, a game console, a tablet computer, a wearable device, or any combination of these devices.

In a typical configuration, the computer includes one or more central processing units (CPUs), on or more input/output interfaces, one or more network interfaces, and one or more memories.

The memory may include a non-persistent memory, a random access memory (RAM), and/or a non-volatile memory in a computer readable medium, such as a read-only memory (ROM) or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD), or another optical storage, a cassette, a magnetic disk storage, a quantum memory, a graphene-based storage medium, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It is also worthwhile to note that the terms "include", "contain" or any other variations thereof are intended to cover a non-exclusive inclusion, such that a process, method, product, or device including a series of elements includes not only those elements but also other elements not explicitly listed, or elements that are inherent to such process, method, product, or device. In the absence of more restrictions, elements described by the phrase "include a/an . . . " do not exclude the existence of additional identical elements in the process, method, product, or device that includes the elements.

Specific embodiments of the present specification have been described previously. Other embodiments fall within the scope of the appended claims. In some cases, the actions or steps described in the claims can be performed in a different order than in one or more embodiments and can still achieve desired results. In addition, the processes described in the drawings do not necessarily require a specific order or sequential order shown in order to achieve the desired results. In some implementations, multitasking and parallel processing are also possible or may be advantageous.

The terms used in one or more embodiments of the present specification are merely for the purpose of describing specific embodiments, and are not intended to limit one or more embodiments of the present specification. The singular forms of "a/an", "said" and "the" used in one or more embodiments of the present specification and the appended claims are also intended to include plural forms, unless the context clearly indicates other meanings. It should also be understood that the term "and/or" used in the present specification refers to and includes any or all possible combinations of one or more associated listed items.

It should be understood that although the terms first, second, third, etc. may be used in one or more embodiments of the present specification to describe various information, the information should not be limited to these terms. These terms are merely used to distinguish the same type of information from each other. For example, without departing from the scope of one or more embodiments of the present specification, first information can also be referred to as second information, and similarly, second information can also be referred to as first information. Depending on the context, the word "if" as used here can be interpreted as "at the time of" or "when" or "in response to determination."

The previous descriptions are merely preferred embodiments in one or more embodiments of the present application, and are not intended to limit one or more embodiments of the present specification. Any modifications, equivalent substitutions, improvements, etc. that come within the spirit and principles of one or more embodiments of the present specification are intended to be included within the scope of one or more embodiments of the present specification.

What is claimed is:

1. A computer-implemented method, comprising:
   receiving, at a service processor, an access request from a data user to access target data;
   obtaining, at the service processor, the target data from a data owner, wherein the service processor has permission to obtain the target data from the data owner;

generating, at the service processor, a blockchain transaction that executes an operation of recording the target data in a blockchain in response to determining that the target data is requested by the access request, the blockchain transaction comprising an original form of the target data;

transmitting, from the service processor, the blockchain transaction to a blockchain node, included in the blockchain, that stores the blockchain transaction in the blockchain when a transaction consensus is reached on the blockchain transaction, wherein the blockchain stores blockchain transactions that are associated with data responsive to an access to the data requested by a respective data user;

receiving, at the service processor, index information for the blockchain transaction from the blockchain node;

receiving verifiable authorization information transmitted by the data user;

determining whether the verifiable authorization information i) is signed by the data owner using a private key of the data owner, ii) contains identification information of the target data, and iii) is received from the data user who initiates the access request, wherein determining that the verifiable authorization information is received from the data user comprises:
transmitting a random character to the data user,
receiving a signed random character from the data user, and
determining that the signed random character is signed with a private key of the data user; and in response to determining that the verifiable authorization information i) is signed by the data owner using the private key of the data owner, ii) contains the identification information of the target data, and iii) is received from the data user who initiates the access request, sending, from the service processor, the target data or the index information to the data user.

2. The computer-implemented method of claim 1, wherein the service processor is a service system corresponding to the data owner, and wherein the obtaining target data from a data owner comprises:
generating identification information of the target data from the access request;
generating an acquisition request comprising the identification information of the target data; and
transmitting the acquisition request to a data management system corresponding to the data owner, wherein the acquisition request is parsed by the data management system to generate the identification information, and the data management system searches for the target data based on the identification information.

3. The computer-implemented method of claim 1, wherein the obtaining the target data from the data owner comprises:
generating the identification information of the target data from the access request;
generating an acquisition request comprising the identification information of the target data; and
determining the data owner storing the target data; and
transmitting the acquisition request to a service system of the data owner, wherein the acquisition request is sent by the service system to a data management system of the data owner and parsed by the data management system to generate the identification information, and the data management system searches for the target data based on the identification information.

4. The computer-implemented method of claim 3, wherein the determining the data owner storing the target data comprises:
generating indication information that indicates the data owner storing the target data from the access request; or
determining the data owner storing the target data from a pre-created data storage record table based on the identification information, wherein the pre-created data storage record table records data identification information stored by each data owner.

5. The computer-implemented method of claim 1, further comprising:
determining whether the target data has already stored in the blockchain in response to the access request for the target data from the data user; and
in response to determining that the target data has already stored in the blockchain, sending the index information to the data user; or
in response to determining that the target data has not stored in the blockchain, executing the operation of recording the target data.

6. The computer-implemented method of claim 1,
wherein the blockchain node performs the transaction consensus with remaining blockchain nodes in the blockchain, stores the blockchain transaction in the blockchain upon reaching the transaction consensus on the blockchain transaction, and generates the index information for the blockchain transaction,
wherein the index information comprises a hash value of the blockchain transaction, a serial number of the blockchain transaction, or a hash value of the target data, and
wherein the index information is used by the data user to generate a request transaction to obtain the blockchain transaction or the target data in the blockchain transaction from the blockchain.

7. A non-transitory, computer-readable medium storing one or more instructions executable by a computer system to perform operations comprising:
receiving, at a service processor, an access request from a data user to access target data;
obtaining, at the service processor, the target data from a data owner, wherein the service processor has permission to obtain the target data from the data owner;
generating, at the service processor, a blockchain transaction that executes an operation of recording the target data in a blockchain in response to determining that the target data is requested by the access request, the blockchain transaction comprising an original form of the target data;
transmitting, from the service processor, the blockchain transaction to a blockchain node, included in the blockchain, that stores the blockchain transaction in the blockchain when a transaction consensus is reached on the blockchain transaction, wherein the blockchain stores blockchain transactions that are associated with data responsive to an access to the data requested by a respective data user;
receiving, at the service processor, index information for the blockchain transaction from the blockchain node;
receiving verifiable authorization information transmitted by the data user;
determining whether the verifiable authorization information i) is signed by the data owner using a private key of the data owner, ii) contains identification information of the target data, and iii) is received from the data user who initiates the access request, wherein determining that the verifiable authorization information is received from the data user comprises:
transmitting a random character to the data user,
receiving a signed random character from the data user, and
determining that the signed random character is signed with a private key of the data user; and in response to determining that the verifiable authorization information i) is signed by the data owner using the private key of the data owner, ii) contains the identification information of the target data, and iii) is received from the data user who initiates the access request, sending, from the service processor, the target data or the index information to the data user.

8. The non-transitory, computer-readable medium of claim 7, wherein the service processor is a service system corresponding to the data owner, and wherein the obtaining target data from a data owner comprises:

generating identification information of the target data from the access request;
generating an acquisition request comprising the identification information of the target data; and
transmitting the acquisition request to a data management system corresponding to the data owner, wherein the acquisition request is parsed by the data management system to generate the identification information, and the data management system searches for the target data based on the identification information.

9. The non-transitory, computer-readable medium of claim 7,
wherein the obtaining the target data from the data owner comprises:
generating the identification information of the target data from the access request;
generating an acquisition request comprising the identification information of the target data; and
determining the data owner storing the target data; and
transmitting the acquisition request to a service system of the data owner, wherein the acquisition request is sent by the service system to a data management system of the data owner and parsed by the data management system to generate the identification information, and the data management system searches for the target data based on the identification information.

10. The non-transitory, computer-readable medium of claim 9, wherein the determining the data owner storing the target data comprises:
generating indication information that indicates the data owner storing the target data from the access request; or
determining the data owner storing the target data from a pre-created data storage record table based on the identification information, wherein the pre-created data storage record table records data identification information stored by each data owner.

11. The non-transitory, computer-readable medium of claim 7, wherein the operations further comprise:
determining whether the target data has already stored in the blockchain in response to the access request for the target data from the data user; and
in response to determining that the target data has already stored in the blockchain, sending the index information to the data user; or
in response to determining that the target data has not stored in the blockchain, executing the operation of recording the target data.

12. The non-transitory, computer-readable medium of claim 7,
wherein the blockchain node performs the transaction consensus with remaining blockchain nodes in the blockchain, stores the blockchain transaction in the blockchain upon reaching the transaction consensus on the blockchain transaction, and generates the index information for the blockchain transaction,
wherein the index information comprises a hash value of the blockchain transaction, a serial number of the blockchain transaction, or a hash value of the target data, and
wherein the index information is used by the data user to generate a request transaction to obtain the blockchain transaction or the target data in the blockchain transaction from the blockchain.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a service processor, an access request from a data user to access target data;
obtaining, at the service processor, the target data from a data owner, wherein the service processor has permission to obtain the target data from the data owner;
generating, at the service processor, a blockchain transaction that executes an operation of recording the target data in a blockchain in response to determining that the target data is requested by the access request, the blockchain transaction comprising an original form of the target data;
transmitting, from the service processor, the blockchain transaction to a blockchain node, included in the blockchain, that stores the blockchain transaction in the blockchain when a transaction consensus is reached on the blockchain transaction, wherein the blockchain stores blockchain transactions that are associated with data responsive to an access to the data requested by a respective data user;
receiving, at the service processor, index information for the blockchain transaction from the blockchain node;
receiving verifiable authorization information transmitted by the data user;
determining whether the verifiable authorization information i) is signed by the data owner using a private key of the data owner, ii) contains identification information of the target data, and iii) is received from the data user who initiates the access request,
wherein determining that the verifiable authorization information is received from the data user comprises:
transmitting a random character to the data user,
receiving a signed random character from the data user, and
determining that the signed random character is signed with a private key of the data user; and
in response to determining that the verifiable authorization information i) is signed by the data owner using the private key of the data owner, ii) contains the identification information of the target data, and iii) is received from the data user who initiates the access request, sending, from the service processor, the target data or the index information to the data user.

14. The computer-implemented system of claim 13, wherein the service processor is a service system corresponding to the data owner, and wherein the obtaining target data from a data owner comprises:
- generating identification information of the target data from the access request;
- generating an acquisition request comprising the identification information of the target data; and
- transmitting the acquisition request to a data management system corresponding to the data owner, wherein the acquisition request is parsed by the data management system to generate the identification information, and the data management system searches for the target data based on the identification information.

15. The computer-implemented system of claim 13, wherein the obtaining the target data from the data owner comprises:
- generating the identification information of the target data from the access request;
- generating an acquisition request comprising the identification information of the target data; and
- determining the data owner storing the target data; and
- transmitting the acquisition request to a service system of the data owner, wherein the acquisition request is sent by the service system to a data management system of the data owner and parsed by the data management system to generate the identification information, and the data management system searches for the target data based on the identification information.

16. The computer-implemented system of claim 15, wherein the determining the data owner storing the target data comprises:
- generating indication information that indicates the data owner storing the target data from the access request; or
- determining the data owner storing the target data from a pre-created data storage record table based on the identification information, wherein the pre-created data storage record table records data identification information stored by each data owner.

17. The computer-implemented system of claim 13, wherein the one or more operations further comprise:
- determining whether the target data has already stored in the blockchain in response to the access request for the target data from the data user; and
- in response to determining that the target data has already stored in the blockchain, sending the index information to the data user; or
- in response to determining that the target data has not stored in the blockchain, executing the operation of recording the target data.

\* \* \* \* \*